United States Patent [19]

Northrop, Jr. et al.

[11] 4,187,683
[45] Feb. 12, 1980

[54] THERMAL POWER ELEMENT WITH SAFETY LOCKUP

[75] Inventors: Richard A. Northrop, Jr., Cheshire; David J. Wanat, Meriden, both of Conn.

[73] Assignee: Century Brass Products, Inc., Waterbury, Conn.

[21] Appl. No.: 914,522

[22] Filed: Jun. 12, 1978

[51] Int. Cl.² .................... F03G 7/06; G05D 23/12
[52] U.S. Cl. ................................ 60/527; 92/23; 169/42; 169/57; 236/100
[58] Field of Search ........... 169/57, 42; 92/23; 251/11; 60/527; 236/100

[56] References Cited

U.S. PATENT DOCUMENTS

| | | | |
|---|---|---|---|
| 3,386,065 | 5/1968 | Algino | 236/100 |
| 3,574,275 | 4/1971 | Staschke | 236/100 X |
| 3,802,510 | 4/1974 | Johnson | 236/100 X |

*Primary Examiner*—Allen M. Ostrager
*Attorney, Agent, or Firm*—Donald J. Hayes; R. William Reinsmith

[57] ABSTRACT

A fusible link is provided in a force transmitting device. Upon reaching a preselected temperature, the fusible link melts causing a cooperating locking member to engage a shoulder on a power piston to secure the same in an extended operating position and effect a lock-open condition for certain critical applications.

14 Claims, 8 Drawing Figures

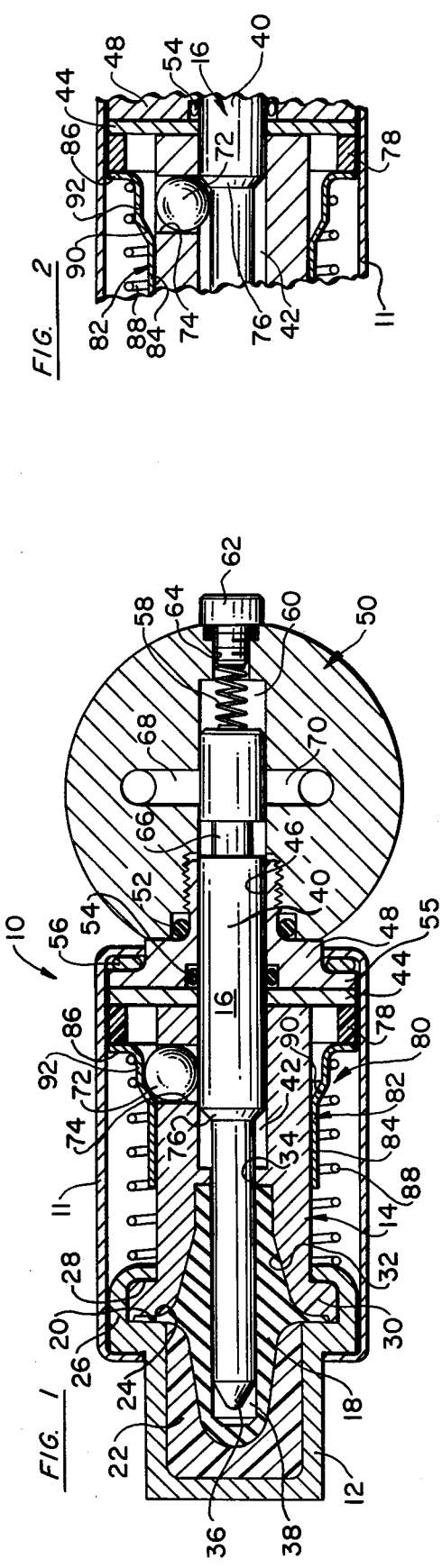

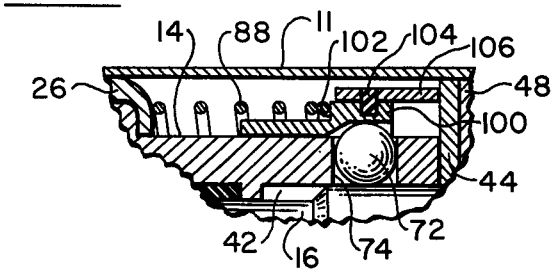
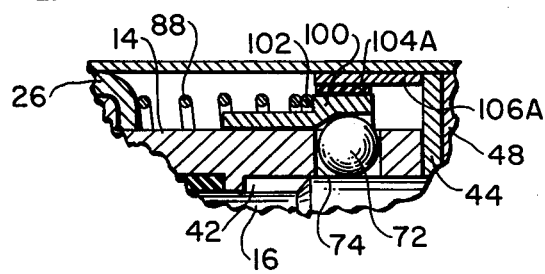
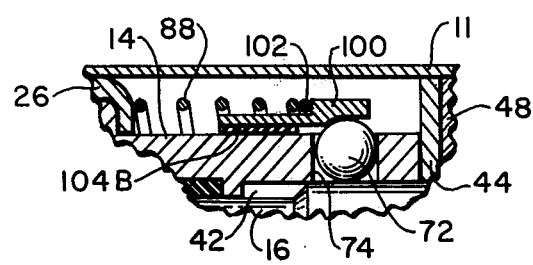
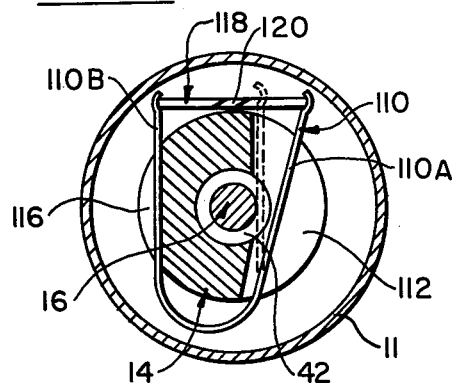
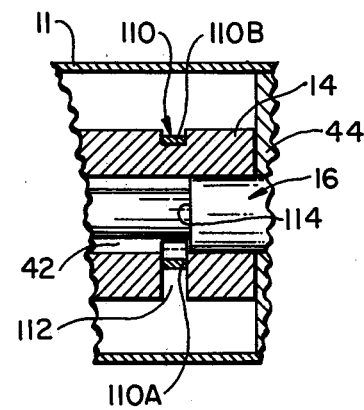

THERMAL POWER ELEMENT WITH SAFETY LOCKUP

This invention generally relates to temperature responsive force transmitting devices and particularly concerns such a device featuring a safety lockup.

A primary object of this invention is to provide a new and improved thermal power element particularly suited for use with an automatic sprinkler system for fire protection services and which will automatically respond at a preselected temperature to lock open the system under critical conditions.

Another object of this invention is to provide a new and improved thermal power element having a safety lockup feature operable under specified critical conditions and which is also capable of effecting a force transmitting motion to both activate and deactivate an associated unit providing that ambient temperature conditions do not reach a critical level.

A further object of this invention is to provide a new and improved thermal power element which is not only quick and easy to economically manufacture in production quantities, but is also readily installed in both new and existing systems at low cost for reliable performance under demanding service conditions.

Yet another object of this invention is to provide a thermal power element having a lock open unit which effects a fail-safe function under critical conditions. Included in this object is the provision of a thermally actuated safety lockup which restricts a piston from retracting from an operating position at a preselected temperature to prevent undesired disablement in the event the element may have otherwise been caused to fail for any reason, e.g., by exposure to excessive heat.

Other objects will be in part obvious and in part pointed out more in detail hereinafter.

A better understanding of this invention will be obtained from the following detailed description and the accompanying drawings of illustrative applications of the invention.

In the drawings:

FIG. 1 is a sectional view showing a temperature responsive force transmitting device incorporating this invention and illustrating a power piston of the device in a retracted inoperative position and a safety lockup unit of the device in a normal ready position;

FIG. 2 is a sectional view, partly broken away, showing the safety lockup unit of the device of FIG. 1 in its normal ready position with the power piston in an extended operating position;

FIG. 3 is a sectional view similar to FIG. 1, partly broken away, with the safety lockup unit in locking position and the power piston in extended operating position;

FIGS. 4, 5 and 6 are sectional views, partly broken away, showing three additional embodiments of safety lockup units each of which show an actuator of the unit in a normal ready position with a portion of the power piston of the device shown in retracted inoperative position;

FIG. 7 is a cross sectional view of a portion of a temperature responsive force transmitting device incorporating another embodiment of a safety lockup unit illustrated in full lines in a normal ready position and in broken lines in a locking position; and FIG. 8 is a longitudinal sectional view, partly broken away, showing the power piston of the device of FIG. 7 in an extended operating position and the safety lockup unit shown in a normal ready position in full lines and in locking position in broken lines.

Referring to the drawings in detail, a temperature responsive force transmitting device or thermal power unit illustrated in FIGS. 1–3 of the drawing is generally denoted by the numeral 10 and comprises a housing 11, base cup 12, a piston guide 14, a piston 16 received for linear reciprocating movement within the guide 14 and within a resilient boot 18 which is fitted within the base cup 12 with a neck of the boot 18 extending into the piston guide 14. The boot 18 may be formed of any suitable elastomeric material exhibiting resistance to high temperature, aging and swelling. Boot 18 has a radial flange 20 which serves as a common seal between piston guide 14 and base cup 12.

Cup 12 is filled with a temperature sensitive expansible material such as wax 22, and the cup 12 itself is formed from a thermally conductive material. As is well known in the art, a rise in ambient temperature causes the wax 22 within cup 12 to expand, and such wax expansion acts through boot 18 to force piston 16 to be driven from a retracted inoperative position shown in FIG. 1 to an extended operating position shown in FIGS. 2 and 3. Upon cooling, the wax 22 itself contracts and piston 16 normally returns to its inoperative position by a spring actuated device connected to the thermal power unit 10.

Base cup 12 has radial shoulder 24 formed about its open end. An annular wall 26 extends from the periphery of shoulder 24 and terminates in an inwardly turned lip 28. The base of boot 18 depends from its radial flange 20 which is clamped between flange 30 of piston guide 14 and shoulder 24 of cup 12. A well 32 is formed within piston guide 14 which tapers away from cup 12 toward a central opening 34 of minimum diameter through which piston 16 extends toward a conical end 36 which fits within a well 38 of boot 18.

An intermediate portion 40 of piston 16 is of relatively enlarged diameter and is received within a piston guide chamber 42 of correspondingly enlarged diameter relative to opening 34. Portion 40 of piston 16 extends through a disk 44 and into a central opening 46 of a coupling 48 threadably connected to a valve body 50, e.g., through which fluid flow may be controlled by the power element 10. A pair of O-ring seals 52 and 54 are fitted on opposite sides of coupling 48 in engagement with valve body 50 and piston portion 40 respectively. Coupling 48 is mounted within an end of housing 11 and has a radial shoulder 55 sandwiched between an overlying annular thermal insulator 56 and the underlying disk 44 which is formed of thermal insulating material.

A piston return spring 58 has one end seated on a terminal face of the power piston 16 received within a chamber 60 of valve body 50. An opposite end of spring 58 seats against screw 62 threadably connected within an opening 64 in valve body 50 axially aligned with chambers 42 and 60 to selectively adjust the return spring force for driving piston 16 from its extended operating position into its retracted inoperative position upon cooling of the wax 22. The power piston 16 received within valve chamber 60 is illustrated as having a reduced diameter portion 66 which upon being moved into operating position as shown in FIG. 3 registers with valve passages 68, 70.

In a typical application, the thermal power element 10 may be connected to any suitable operated unit, and in the illustrated embodiment the operated unit will be understood to be a control valve for a sprinkler system for fire protection. Upon an ambient temperature rise, the wax 22 expands to drive piston 16 into operating position (FIGS. 2 and 3) to connect valve passages 68, 70 across the reduced diameter portion 66 of piston 16 registering with the passages to permit water flow through valve body 50. Providing that the sprinkler system components are functioning effectively and the water supply is maintained, the sprinkler system will continue to operate so long as power piston 16 remains in operating position. When power piston 16 is returned into its inoperative position (FIG. 1), fluid passages 68, 70 are closed by the relatively enlarged end portion of piston 16 to interrupt operation of the sprinkler head.

In accordance with this invention, a safety lockup feature is provided which, while permitting reciprocating movement of power piston 16 between its inoperative and operating positions under the influence of the wax motor 22 and spring 58 when the ambient temperature is below a preselected temperature, also provides for continual operation of the unit being controlled under critical conditions above the specified preselected temperature. The safety lockup feature of this invention comprises locking means movable into a locking position in cooperation with the piston in its operating position and restraining means for securing the locking means in locking position at a preselected temperature to effect piston lockup.

The locking means in the embodiment of FIGS. 1–3, comprises a locking ball 72 received within a side wall opening 74 in piston guide 14 wherein the side wall opening 74 is in communication with and extends radially from the chamber 42 of piston guide 14. Side wall opening 74 is located in a predetermined position axially of chamber 42 such that a locking shoulder 76 of piston 16 formed by the differential diameter portions of the piston 16 is disposed for locking engagement with ball 72 when piston 16 is in its extended operating position (FIGS. 2 and 3).

When the piston 16 has reached its maximum stroke in response to a rise in ambient temperature and is driven into its operating position by the wax motor 22, the locking ball 72 is free to move in and out of guide chamber 42 without locking the piston 16 providing that the ambient temperature has not exceeded a preselected temperature which is the melting point of spacer 78 of a restraining assembly 80. In the embodiment of FIGS. 1–3, the spacer 78 is formed as a ring of solid material which is fusible at said preselected temperature and is mounted within the housing 11 in engagement with the insulating disk 44. A cam sleeve 82 of the restraining assembly 80 is provided with an end skirt 84 supported on piston guide 14 for sliding movement and has a radial flange 86 at the opposite end of sleeve 82 which is urged into seating engagement with spacer 78 by a compression spring 88 mounted within housing 11 in surrounding relation to the piston guide 14 and sleeve 82.

Spring 88 has its opposite ends respectively seated against lip 28 of base cup 12 and the radial flange 86 of sleeve 82 and is installed in a compressed or loaded condition to a predetermined spring load. Sleeve 82 has an annular cam shoulder 90 connecting the skirt 84 with a maximum diameter portion 92 of sleeve 82 which merges with the outwardly flared radial flange 86.

To effectively secure piston lockup under critical conditions above a specified temperature wherein it is desired or imperative that the valve passages 68, 70 be maintained in communication to ensure continuous water flow, e.g., to the sprinkler head, once the ambient temperature reaches the melting point of spacer 78 with the piston 16 in extended operating position, the spacer 78 melts and the installed spring load of spring 88 drives cam shoulder 90 of sleeve 82 over the locking ball 72 and traps it in guide chamber 42 against the piston locking shoulder 76 (FIG. 3). When the ambient temperature lowers, the return force from spring 58 exerts a linear force on piston 16 which tends to wedge ball 72 radially outwardly in guide opening 74. However, ball 72 is captured by end skirt 84 of sleeve 82 which is maintained by the spring 88 in overlying relation to side wall opening 74 of guide 14. Ball 72 is accordingly fixed relative to piston 16 in engagement against its locking shoulder 76 preventing any return of piston 16 and thereby maintaining the sprinkler head in an operating functional condition providing fail-safe operation.

Accordingly, spacer 78 and sleeve 82 function as an actuator and the sleeve is driven by spring 88 into a lockup position (FIG. 3) for securing piston 16 in its operating position. It will be noted that shielding from heat sources other than ambient temperature conditions is provided by thermal insulators 44 and 56.

Turning now to the embodiments illustrated in FIGS. 4, 5 and 6 wherein like numerals are used to designate parts identical to those described in the embodiment of FIGS. 1–3, actuator assemblies are illustrated as including sleeve components 100 similar to sleeve 82 in the first embodiment of FIGS. 1–3. The sleeve components 100 each have an external shoulder 102 serving as a seat for spring 88.

In the embodiment of FIG. 4, a fusible link is provided at 104 in the form of a fastener made of a solid material fusible at a preselected temperature and serving to secure the sleeve 100 in fixed relation to piston guide 14 under ambient temperature conditions below a specified preselected temperature. The fusible fastener 104 connects a ring member 106 to underlying sleeve 100 with ring 106 being maintained in engagement against insulating disk 44 within housing 11 under the biasing force of spring 88. Upon ambient temperature rising to the specified preselected temperature which is equal to the melting point of fusible fastener 104, the sleeve 100 will cam ball 72 into piston guide chamber 42 and end skirt 84 will overly guide opening 74 thereby trapping ball 72 in a safety lockup condition. It is to be understood that the wax motor, not shown, will always drive power piston 16 into its operating position (such as shown in FIGS. 2 and 3) during an ambient temperature rise before that ambient temperature reaches the specified preselected temperature or melting point of fusible link 104.

In the embodiments of FIGS. 5 and 6, the actuator sleeve 100 is shown as being substantially identical to that illustrated in the above described embodiment of FIG. 4 while the fusible link is respectively illustrated as a solder joint securing the actuator sleeve 100 in fixed relation to piston guide 14. The solder joint 104A in FIG. 5 is secured to an overlying sleeve 106A surrounding the actuator sleeve 100 and urged against insulating disk 44 by spring 88. In FIG. 6, the actuator sleeve 100 is directly soldered by fusible link 104B to an outside surface of piston guide 14. In both embodiments, upon the ambient temperature reaching the melting point of the solder joints 104A and 104B, the actuator sleeve 100 will be driven by spring 88 from its normal position illustrated in FIGS. 5 and 6 against the insulating disk 44 when piston 16 is in its operating position to effect the safety lockup as previously described in connection with the embodiment of FIGS. 1-3.

In FIGS. 7 and 8, a flat spring 110 of U-shaped configuration is provided forming a locking means mounted within housing 11 in registration with a side wall opening 112 in piston guide 14. The side wall opening 112 is in communication with chamber 42 of the piston guide such that locking shoulder 114 of piston 16 is disposed for locking engagement with arm 110A of spring 110 when piston 16 is in its operating position (FIG. 7). Spring 110 is formed of a suitable material having a resiliency which continuously urges its spring arms 110A and 110B toward one another. A groove 116 formed in guide 14 provides for retaining arm 110B in position. The preferred embodiment shows a spacer 118 extending between free ends of spring arms 110A and 110B, the spacer 118 serving as a restraining means to maintain spring 110 in a normal ready position illustrated in full lines in FIGS. 7 and 8 when the ambient temperature is below a specified preselected temperature. The temperature specified may be preselected at a prescribed melting point of spacer 118 or a fusible link portion of the spacer such as illustrated at 120 in FIG. 7. When the ambient temperature rises to the melting point of the fusible portion or link 120 of spacer 118, the link 120 melts and arms 110A and 110B are released such that the resiliency of the spring material drives spring arm 110A from normal ready position shown in full lines in FIGS. 7 and 8 into a locking position illustrated by broken lines in those figures. As in the above described embodiments, the melting point of the fusible link 120 of spacer 118 is above that required for the wax motor to drive power piston 16 into its operating position such that its locking shoulder 114 is disposed for locking engagement with spring arm 110A upon its snapping into locking position when spacer 118 is effectively destroyed to activate the safety lockup.

The fusible link of the safety lockup of this invention may be provided by any suitable solid material which has a melting point at a specified temperature to secure the piston 16 in operating position under extreme conditions. Tin which has a melting point of about 450° F. has been found to perform satisfactorily as a fusible link, as has a eutectic alloy comprising 97.5% lead, 1.5% silver and 1.0% tin having a melting point of about 588° F. Another alloy which may be used comprises a solid fusible material formed of 92.5% lead, 5.0% tin and 2.5% silver having a melting point at about 536° F. The wax motor 22 will normally operate to stroke power piston 16 through its maximum stroke into operating position at about 140° F.

In accordance with the teachings of this disclosure, it will be seen that a compact low-cost thermal power element is provided which is capable of reliable operation under demanding conditions and which effects a safety lockup particularly useful for automatic sprinklers for fire protection services.

As will be apparent to persons skilled in the art, various modifications, adaptations and variations of the foregoing specific disclosure can be made without departing from the teachings of this invention.

We claim:

1. In a temperature responsive force transmitting device including a housing having a closed end containing a temperature sensitive expansible material and a piston guide having an interior guide chamber, a resilient boot within the housing adjacent the expansible material and having a neck extending within the piston guide, and a piston received within the boot and the guide chamber, the piston being axially movable between an inoperative position and an extended operating position respectively upon contraction and expansion of the temperature sensitive expansible material, a safety lockup comprising locking means within the housing movable into a locking position in cooperation with the piston in its operating position, and restraining means selectively operable for securing the locking means in locking position at a preselected temperature to lockup the piston in its operating position.

2. The invention of claim 1 wherein the restraining means includes a locking shoulder formed on the piston, and wherein the piston guide includes a side wall opening, said side wall opening being in communication with the chamber of the piston guide such that the locking shoulder of the piston is disposed for locking engagement with said locking means in locking position when the piston is in its operating position.

3. The invention of claim 2 wherein the locking means includes a locking member movable within the side wall opening of the piston guide into a locking position in engagement with the locking shoulder of the piston in its operating position.

4. The invention of claim 2 wherein the locking means includes a locking ball movable within the side wall opening of the piston guide toward and away from locking position in engagement with the locking shoulder of the piston when the ambient temperature is below said preselected temperature.

5. The invention of claim 4 wherein the locking means further includes spring means and an actuator, the actuator being mounted within the housing for movement from a normal ready position into a lockup position, the actuator in normal ready position permitting free movement of the locking ball toward and away from its locking position, the actuator in lockup position trapping the locking ball in locking position between the actuator and the piston with the ball engaging the piston locking shoulder, the spring means urging the actuator toward its lockup position, and wherein the restraining means further includes a fusible link normally securing the actuator in its ready position against the biasing force of the spring means in fixed relation to the piston guide when the ambient temperature is below said preselected temperature, the link being fusible at said preselected temperature such that the actuator is driven by the spring means into lockup position for fixing the piston in its operating position.

6. The invention of claim 5 wherein the fusible link is a spacer formed of a solid material fusible at said preselected temperature and normally disposed in fixed relation to the actuator and the housing.

7. The invention of claim 5 wherein the fusible link is a fastener formed of a solid material fusible at said preselected temperature and securing the actuator in fixed relation to the piston guide under ambient temperature conditions below said preselected temperature.

8. The invention of claim 5 wherein the fusible link is a solder joint formed of a solid material fusible at said preselected temperature and securing the actuator in fixed relation to the piston guide under ambient temperature conditions below said preselected temperature.

9. The invention of claim 2 wherein the locking means includes a locking member mounted within the housing in registration with the side wall opening of the piston guide for movement from a normal ready position in disengaged relation to the piston, into a locking position with the locking member engaging the locking shoulder of the piston, the locking member being formed of a spring material having a resiliency urging the locking member toward its locking position in engagement with the piston, and wherein the restraining means includes a fusible link maintaining the locking member in its normal ready position when the ambient temperature is below said preselected temperature, the link upon being fused releasing the locking member from its normal ready position to be driven by the resiliency of its spring material from its normal ready position into said locking position, the locking member also being maintained in said locking position by the resiliency of its spring material.

10. In a temperature responsive force transmitting device including a housing having a closed end containing a temperature sensitive expansible material, a piston guide having a chamber extending therethrough and a side wall opening communicating with the chamber, a resilient boot within the housing adjacent the expansible material and having a neck extending within the piston guide, and a piston received within the piston guide chamber and extending into the boot for reciprocating movement toward and away from an operating position upon expansion and retraction respectively of the expansible material, the piston having a surface of differential diameter providing a locking shoulder, the improvement wherein a safety lockup comprises a locking member movable within the side wall opening of the piston guide for engaging the locking shoulder on the piston when the piston is in its operating position, and a selectively operable actuator for securing the locking member in locking position in engagement with the locking shoulder of the piston in its operating position at a preselected temperature, the actuator including a link fusible at said preselected temperature to effect said engagement between the locking member in locking position with said shoulder on the piston.

11. The invention of claim 10 wherein the selectively operable actuator further includes a sleeve of varying inside diameter telescopically supported on the piston guide for movement from a normal ready position to a lockup position, the sleeve in its normal ready position being radially spaced apart from the locking member, the sleeve in lockup position being axially displaced on the piston guide relative to its normal ready position and engaging the locking member to urge it radially inwardly to secure the locking member in engagement with said locking shoulder, and biasing means urging the sleeve into said lockup position, the fusible link normally maintaining the sleeve in its said ready position against the force of said biasing means when the ambient temperature is below said preselected temperature.

12. The invention of claim 11 further including a spacer comprising said fusible link formed of a solid material having a melting point at said preselected temperature, the spacer being mounted within the housing for maintaining said sleeve in fixed relation to the piston guide in said normal ready position.

13. The invention of claim 10 wherein the selectively operable actuator is normally maintained by means including the fusible link in fixed relation to the piston guide in a ready position, the actuator being movable from said normal ready position into a lockup position upon melting of said fusible link at said preselected temperature to secure the locking member in engagement with the locking shoulder of the piston.

14. The invention of claim 10 wherein the actuator includes a generally U-shaped spring having a pair of arms one of which comprises said locking member, the spring being received within the housing with said one arm registrable with the side wall opening of the piston guide, the resiliency of the material of the spring serving to normally bias said one arm into locking engagement with the locking shoulder of the piston, and a spacer including said fusible link extending between the free ends of the arms to normally maintain the same in spaced apart inoperative relation such that upon the ambient temperature reaching said preselected temperature said spacer melts and the biasing force of the spring urges its arms toward one another to effect said locking engagement between said one arm and the locking shoulder of the piston.

* * * * *